United States Patent
Wang et al.

(10) Patent No.: US 12,250,391 B2
(45) Date of Patent: *Mar. 11, 2025

(54) VIDEO CODING WITH TRIANGULAR SHAPE PREDICTION UNITS

(71) Applicant: BEIJING DAJIA INTERNET INFORMATION TECHNOLOGY CO., LTD., Beijing (CN)

(72) Inventors: Xianglin Wang, San Diego, CA (US); Yi-Wen Chen, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,468

(22) Filed: Feb. 6, 2023

(65) Prior Publication Data

US 2023/0199208 A1 Jun. 22, 2023

Related U.S. Application Data

(63) Continuation of application No. 17/353,808, filed on Jun. 21, 2021, now Pat. No. 11,611,769, which is a (Continued)

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/137* (2014.11); *H04N 19/172* (2014.11)

(58) Field of Classification Search
CPC .............................. H04N 19/119; H04N 19/52
See application file for complete search history.

(56) References Cited

U.S. PATENT DOCUMENTS 11,134,251 B2 * 9/2021 Wang .................... H04N 19/117
11,134,261 B2 * 9/2021 Wang .................... H04N 19/513
(Continued)

FOREIGN PATENT DOCUMENTS

CN 104980762 A 10/2015
CN 112673633 A 4/2021
(Continued)

OTHER PUBLICATIONS

Triangular prediction unit mode; Liao—Oct. 2018. (Applicant admitted PA). (Year: 2018).*

(Continued)

*Primary Examiner* — Luis Perez-Fuentes
(74) *Attorney, Agent, or Firm* — Arch & Lake LLP (57) ABSTRACT

A method of constructing a uni-directional motion vector merge list for triangular shape processing units (PUs) in the triangle prediction mode of video coding standards, such as the current Versatile Video Coding (VVC), is performed at a computing device. The computing device constructs the motion vector merge list for the coding unit (CU) containing the triangular shape PUs, and then constructs the uni-directional motion vector merge list for the triangular shape PUs based on the motion vector merge list for the CU.

15 Claims, 7 Drawing Sheets

Related U.S. Application Data continuation of application No. PCT/US2019/068512, filed on Dec. 25, 2019.

(60) Provisional application No. 62/784,770, filed on Dec. 25, 2018.

(51) Int. Cl.
*H04N 19/137* (2014.01)
*H04N 19/172* (2014.01)

(56) References Cited

U.S. PATENT DOCUMENTS

| | | | |
|---|---|---|---|
| 11,218,720 B2* | 1/2022 | Lee | H04N 19/513 |
| 11,259,043 B2* | 2/2022 | Lee | H04N 19/70 |
| 11,611,769 B2* | 3/2023 | Wang | H04N 19/172 |
| 2003/0048955 A1 | 3/2003 | Pardes et al. | |
| 2015/0043650 A1 | 2/2015 | Yie et al. | |
| 2016/0127734 A1 | 5/2016 | Nurijanyan | |
| 2020/0029087 A1* | 1/2020 | Lim | H04N 19/577 |
| 2020/0120334 A1* | 4/2020 | Xu | H04N 19/573 |

FOREIGN PATENT DOCUMENTS

| | | |
|---|---|---|
| CN | 113170112 A | 7/2021 |
| CN | 113475081 A | 10/2021 |
| KR | 1020170124077 A | 11/2017 |
| KR | 1020180134764 A | 12/2018 |
| WO | 2013056656 A1 | 4/2013 |
| WO | 2020103934 A1 | 5/2020 |
| WO | 2020106189 A1 | 5/2020 |
| WO | 2020118064 A1 | 6/2020 |

OTHER PUBLICATIONS

Improved method for triangular merge-list construction; Wang—Jan. 2019. (Applicant admitted PA). (Year: 2019).*
Simplification of triangular merging, candidate list derivation; Chuang—Jan. 2019. (Applicant admitted PA). (Year: 2019).*
International Search Report of PCT Application No. PCT/CN2019/068512 dated Apr. 24, 2020, (2p).
Chen, J. et al., "Algorithm Description For Versatile Video Coding and Test Model 2 (VTM2)" Joint Video Exploration Team of ITU-T SG16 WP3 and ISO/IEC JTC1/SC29/WG11, JVET-K1002, 11th Meeting, Jul. 2018 (21p).
Sullivan, G.J., et al., "Overview of the High Efficiency Video Coding (HEVC) Standard", IEEE Trans. Circuits and Systems for Video Technology, vol. 22, No. 12, pp. 1649-1668, Dec. 2012, (20p).
European Search Report of EP Application No. 19902913.3 dated Jul. 25, 2022, (7p).
Chuang, Tsu-Der et al., "CE10-related: Simplification of triangle merging candidate list derivation", Joint Video Experts Team (JVET) of ITU-T SG 16 WP 3 and ISO/IEC JTC 1/SC 29/WG 11, JVET-M0184-v1, 13th Meeting: Marrakech, MA, Jan. 9-18, 2019, (3p).
Wang, Xianglin et al., "Non-CE10: Triangle prediction merge list construction", Joint Video Experts Team (JVET) of ITU-T SG 16 WP 3 and ISO/IEC JTC 1/SC 29/WG 11, JVET-M0233, 13th Meeting: Marrakech, MA, Jan. 9-18, 2019, (3p).
Solovyev, Timofey et al., "Non-CE4: Simplifications for triangular prediction mode", Joint Video Experts Team (JVET) of ITU-T SG 16 WP 3 and ISO/IEC JTC 1/SC 29/WG11, JVET-M0286-v2, 13th Meeting: Marrakech, MA, Jan. 9-18, 2019, (7p).
Wang, Xianglin et al., "CE4-related: An improved method for triangle merge list construction", Joint Video Experts Team (JVET) of ITU-T SG 16 WP 3 and ISO/IEC JTC 1/SC 29/WG 11, JVET-N0340, 14th Meeting: Geneva, CH, Mar. 19-27, 2019, (3p).
Chen, Jianle et al., Algorithm description for Versatile Video Coding and Test Model 3 (VTM 3), Joint Video Experts Team (JVET) of ITU-T SG 16 WP 3 and ISO/IEC JTC 1/SC 29/WG 11, JVET-L1002-v1, 12th Meeting: Macao, China, Oct. 3-12, 2018, (48p).
Liao, Ru-Ling et al., "CE10.3.1.b: Triangular prediction unit mode", Joint Video Experts Team (JVET) of ITU-T SG 16 WP 3 and ISO/IEC JTC 1/SC 29/WG 11, JVET-L0124-v2, (8p).
Liao, Ru-Ling et al., "CE10.3.1.b: Triangular prediction unit mode", Joint Video Exploration Team (JVET) of ITU-T SG 16 WP 3 and ISO/IEC JTC 1/SC 29/WG 11, JVET-L0124-v1, 12th Meeting: Macao, CN Oct. 3-12, 2018, (6p).

* cited by examiner

VIDEO CODING WITH TRIANGULAR SHAPE PREDICTION UNITS

CROSS-REFERENCE TO RELATED APPLICATIONS

This application is a continuation of U.S. patent application Ser. No. 17/353,808 filed on Jun. 21, 2021, which is a continuation of PCT Application PCT/US2019/068512 filed Dec. 25, 2019 that claims the benefit of U.S. provisional patent application Ser. No. 62/784,770 filed Dec. 25, 2018, the disclosures of which are incorporated herein by reference in their entireties for all purposes.

FIELD

The present disclosure relates generally to video coding and compression. More specifically, this disclosure relates to systems and methods for performing video coding using triangular shape prediction units.

BACKGROUND

This section provides background information related to the present disclosure. The information contained within this section should not necessarily be construed as prior art.

Any of various video coding techniques may be used to compress video data. Video coding can be performed according to one or more video coding standards. Some illustrative video coding standards include versatile video coding (VVC), joint exploration test model (JEM) coding, high-efficiency video coding (H.265/HEVC), advanced video coding (H.264/AVC), and moving picture experts group (MPEG) coding.

Video coding generally utilizes predictive methods (e.g., inter-prediction, intra-prediction, or the like) that take advantage of redundancy inherent in video images or sequences. One goal of video coding techniques is to compress video data into a form that uses a lower bit rate, while avoiding or minimizing degradations to video quality.

Predictive methods utilized in video coding typically include performing spatial (intra frame) prediction and/or temporal (inter frame) prediction to reduce or remove redundancy inherent in the video data, and are typically associated with block-based video coding.

In block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs).

Each CU can be coded in either intra, inter or IBC modes. Video blocks in an intra coded (I) slice of a video frame are encoded using spatial prediction with respect to reference samples in neighbor blocks within the same video frame. Video blocks in an inter coded (P or B) slice of a video frame may use spatial prediction with respect to reference samples in neighbor blocks within the same video frame or temporal prediction with respect to reference samples in other previous and/or future reference video frames.

Within each CU, all of the PUs comprising the CU share the same prediction mode (inter, intra or IBC). For each PU, a motion vector competition (MVC) scheme is introduced to select a motion vector candidate from a constructed motion vector candidate list that includes spatial and temporal motion vector candidates. Multiple references to the motion estimation allow finding the best reference in two possible reconstructed reference picture lists (namely Reference Picture List 0 and Reference Picture List 1). Spatial or temporal prediction based on the selected motion vector candidate results in predictive data for the PU. Residual data representing pixel differences between the PU and the predictive data is referred to as the residual signal. For further compression, the residual signal is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

Pursuant to many video codec specifications, each CU is typically partitioned into a plurality of PUs in square or rectangular shapes. Pursuant to video codec specifications such as the current VVC standardization, a CU may also be partitioned into a plurality of triangular shape PUs.

Pursuant to video codec specifications such as the current VVC standardization, constructing a motion vector candidate list for triangular shape PUs typically involves a distinct and different procedure than constructing a motion vector candidate list for unpartitioned CUs.

SUMMARY

This section provides a general summary of the disclosure, and is not a comprehensive disclosure of its full scope or all of its features.

According to a first aspect of the present disclosure, a video coding method is performed at a computing device having one or more processors and memory storing a plurality of programs to be executed by the one or more processors. The method includes partitioning each picture in a video stream into multiple coding tree units (CTUs) and then partitioning each CTU into one or more coding units (CUs). The method further includes partitioning each CU into one or more prediction units (PUs) of triangular shape. The method further includes constructing a motion vector candidate list for the CU. The method further includes constructing a uni-directional motion vector candidate list for the triangular shape PUs comprising the CU based on the motion vector candidate list for the CU, such that a motion vector candidate may be selected from the uni-directional motion vector candidate list for each of the triangular shape PUs.

According to a second aspect of the present application, a computing device includes one or more processors, memory and a plurality of programs stored in the memory. The programs, when executed by the one or more processors, cause the computing device to perform operations as described above.

According to a third aspect of the present application, a non-transitory computer readable storage medium stores a plurality of programs for execution by a computing device having one or more processors. The programs, when executed by the one or more processors, cause the computing device to perform operations as described above.

BRIEF DESCRIPTION OF THE DRAWINGS

Hereinafter, sets of illustrative, non-limiting embodiments of the present disclosure will be described in conjunction with the accompanying drawings. Variations of structure, method, or functionality may be implemented by those of ordinary skill in the relevant art based on the examples presented herein, and such variations are all contained within the scope of the present disclosure. In cases where no conflict is present, the teachings of different embodiments may, but need not, be combined with one another.

DETAILED DESCRIPTION

The terms used in the present disclosure are directed to illustrating particular examples, rather than to limit the present disclosure. The singular forms "a" "an" and "the" as used in the present disclosure as well as the appended claims also refer to plural forms unless other meanings are definitely contained in the context. It should be appreciated that the term "and/or" as used herein refers to any or all possible combinations of one or more associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to," depending on the context.

Reference throughout this specification to "one embodiment," "an embodiment," "another embodiment," or the like in the singular or plural means that one or more particular features, structures, or characteristics described in connection with an embodiment are included in at least one embodiment of the present disclosure. Thus, the appearances of the phrases "in one embodiment" or "in an embodiment," "in another embodiment," or the like in the singular or plural in various places throughout this specification are not necessarily all referring to the same embodiment. Furthermore, the particular features, structures, or characteristics in one or more embodiments may be combined in any suitable manner.

Conceptually, many video coding standards are similar, including those previously mentioned in the Background section. For example, virtually all video coding standards use block-based processing, and share similar video coding block diagrams to achieve video compression.

Figure 1:
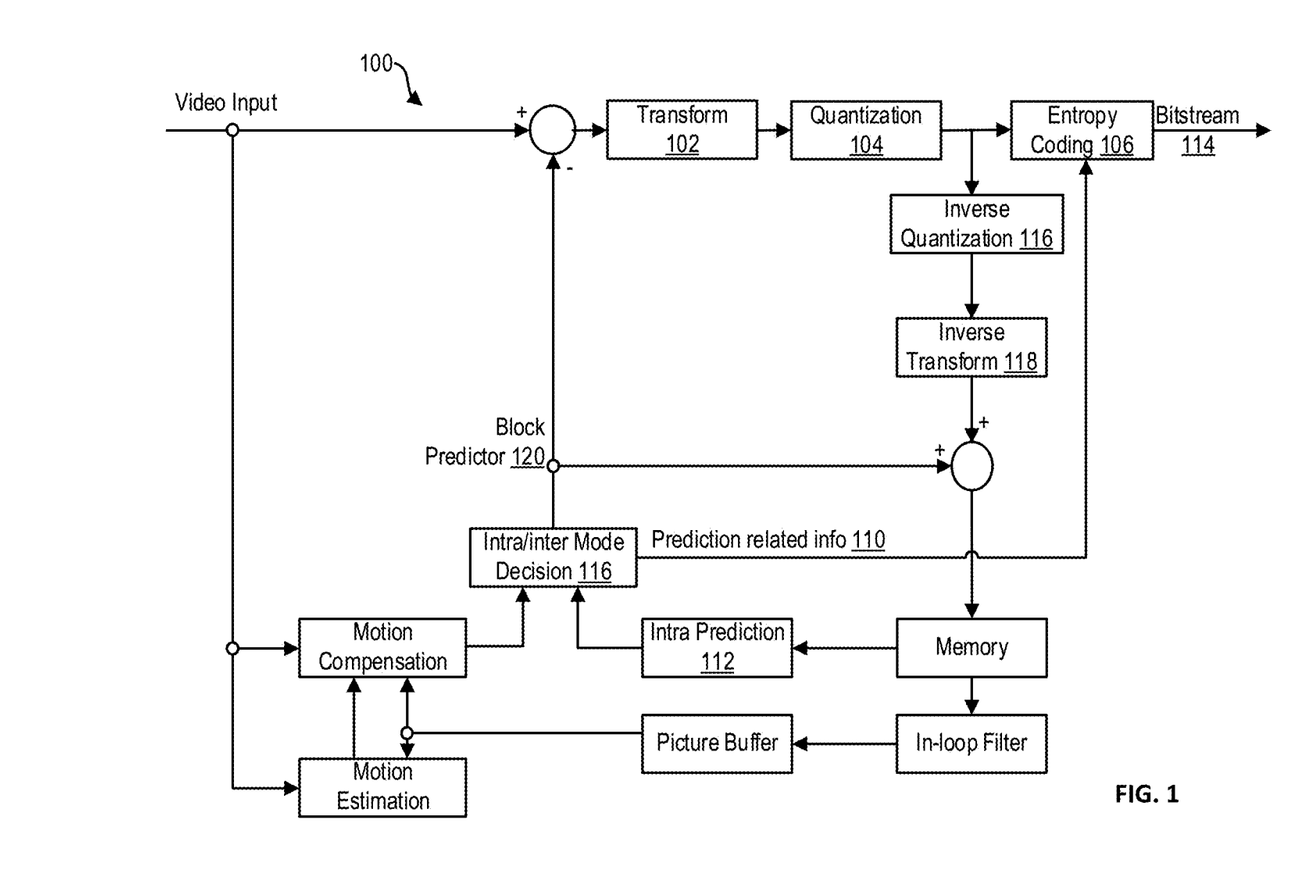
FIG. 1 is a block diagram setting forth an illustrative encoder which may be used in conjunction with many video coding standards.

FIG. 1 shows a block diagram of an illustrative encoder 100 which may be used in conjunction with many video coding standards. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

To improve coding efficiency and visual quality, an in-loop filter is commonly used. For example, a deblocking filter is available in AVC, HEVC as well as the current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
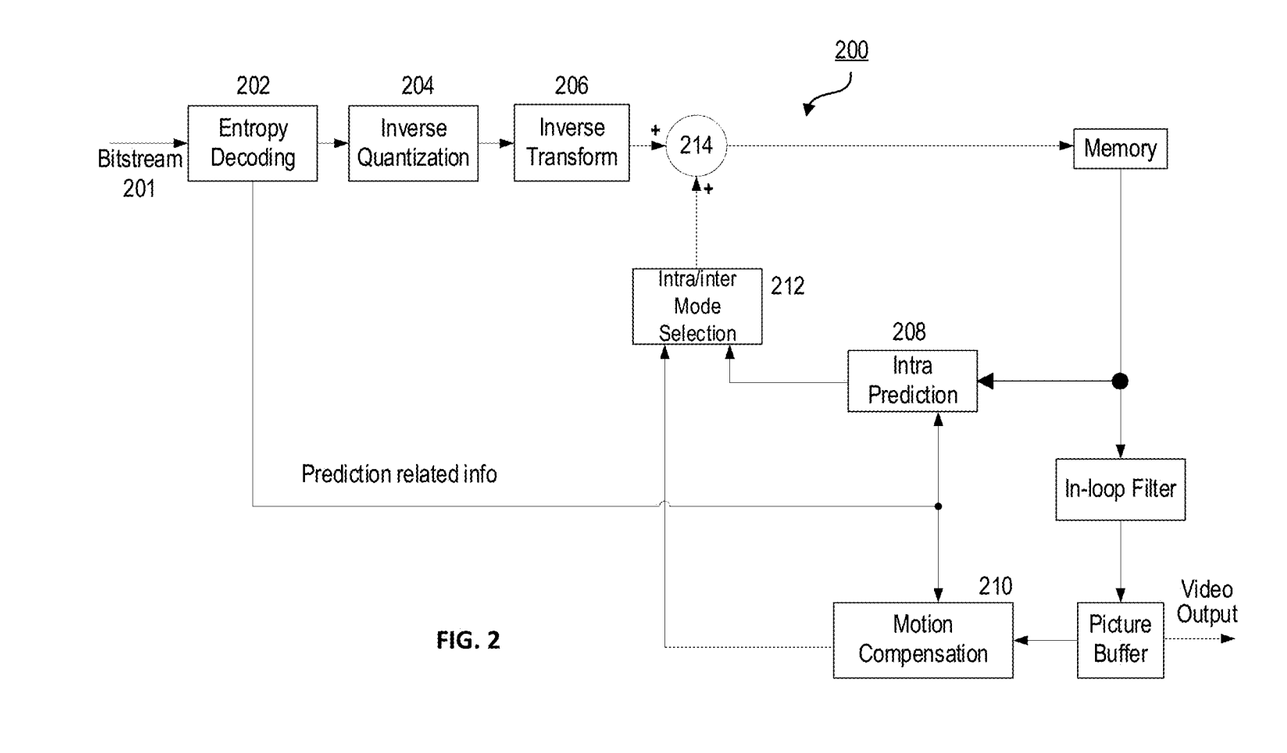
FIG. 2 is a block diagram setting forth an illustrative decoder which may be used in conjunction with many video coding standards.

FIG. 2 is a block diagram setting forth an illustrative decoder 200 which may be used in conjunction with many video coding standards. This decoder 200 is similar to the reconstruction-related section residing in the encoder 100 of FIG. 1. In the decoder 200 (FIG. 2), an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a Summer 214. In situations where an in-loop filter is turned on, a filtering operation is performed on these reconstructed pixels to derive the final reconstructed video for output.

Figure 3:
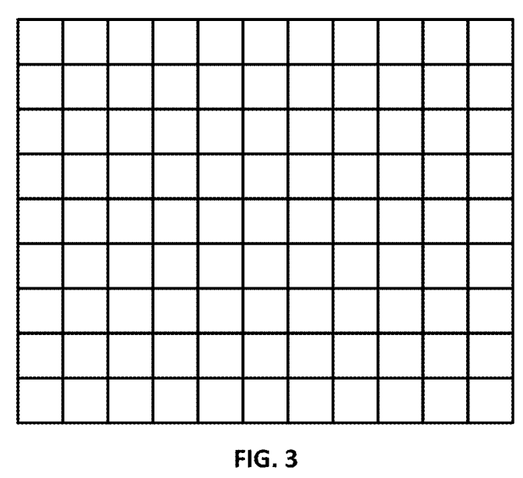
FIG. 3 shows an example of dividing a picture into a plurality of CTUs.

In High Efficiency Video Encoding (HEVC), Joint Exploration Test Model (JEM), and Versatile Video Encoding (VVC), the basic unit for compression is termed coding tree unit (CTU). The maximum CTU size for HEVC and JEM is defined as up to 64 by 64 luma pixels, and two blocks of 32 by 32 chroma pixels for 4:2:0 chroma format. The maximum allowed size of the luma block in a CTU is specified to be 128×128 (although the maximum size of the luma transform blocks is 64×64). FIG. 3 shows the example of a picture divided into CTUs.

Each CTU may contain one coding unit (CU) or recursively split into four smaller CUs until the predefined minimum CU size is reached. Each CU (also named leaf CU) contains one or multiple prediction units (PUs) and a tree of transform units (TUs).

Figure 4:
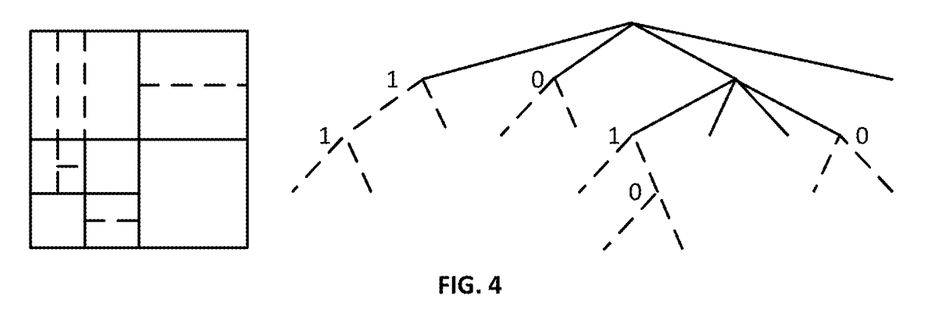
FIG. 4 is an illustration of the quadtree plus binary tree (QTBT) structure which may be used in conjunction with many video coding standards.

In JEM, a CTU is partitioned into CUs by using a quadtree plus binary tree (QTBT) structure. FIG. 4 is an illustration of the QTBT structure. On the left side of FIG. 4, a CTU, represented by the outer square, is first partitioned by a quadtree structure into quadtree leaf nodes. The quadtree leaf nodes are further partitioned by a binary tree structure. There are two splitting types, symmetric horizontal splitting and symmetric vertical splitting, in the binary tree splitting. The binary tree leaf nodes are the CUS, and that segmentation is used for prediction and transform processing without any further partitioning. This means that the CU, PU and TU have the same block size in the QTBT coding block structure. On the right side of FIG. 4, the same QTBT partitioning structure as illustrated on the left side of FIG. 4 is represented as a QTBT diagram, with the top node representing the CTU, solid lines representing quadtree splitting, dotted lines representing binary tree splitting, and leaf nodes representing the CUS. In each splitting (i.e., non-leaf) node of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In HEVC, the decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied, and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One key feature of the HEVC structure is that the HEVC structure has the multiple partition conceptions including CU, PU, and TU.

In VVC, a quadtree with nested multi-type tree using binary and ternary splits segmentation structure replaces the concepts of multiple partition unit types, i.e., VVCremoves the separation of the CU, PU and TU concepts except as needed for CUs that have a size too large for the maximum transform length, and supports more flexibility for CU partition shapes. In the coding tree structure, a CU can have either a square shape or rectangular shape. A CTU is first partitioned by a quaternary tree (a.k.a. quadtree) structure. Then the quaternary tree leaf nodes can be further partitioned by a multi-type tree structure.

Figure 5:
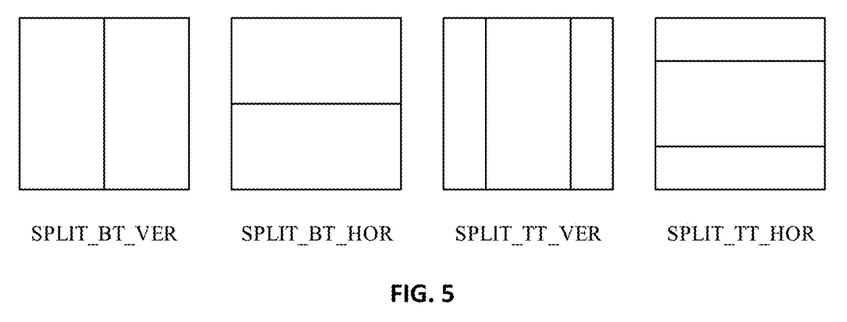
FIG. 5 is an illustration of tree splitting modes which may be used in conjunction with many video coding standards.

FIG. 5 is an illustration of tree splitting modes used in the multi-type tree structure. There are four splitting types in the multi-type tree structure, namely, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The CUs in the multi-type tree structure are the leaf nodes of the multi-type tree structure. Unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or the height of the color component of the CU.

In VVC, for each CU partitioned based on the multi-type tree structure, prediction of the block content can be performed either on the whole CU block or in a sub-block manner explained in the following paragraphs. The operation unit of such prediction is called a prediction unit (or PU).

In case of intra prediction (or intra-frame prediction), usually the size of the PU is equal to the size of CU. In other words, the prediction is performed on the whole CU block. For inter prediction (or inter-frame prediction), the size of the PU can be equal to or less than the size of the CU. In other words, there are cases where a CU may be split into multiple PUs for prediction.

Some examples of a PU size smaller than a CU size include affine prediction mode, Advanced Temporal Motion Vector Prediction (ATMVP) prediction mode, and triangle prediction mode. Under affine prediction mode, a CU may be split into multiple 4×4 PUs for prediction. Motion vectors can be derived for each 4×4 PU and motion compensation can be performed accordingly on the 4×4 PU. Under ATMVP prediction mode, a CU may be split into one or multiple 8×8 PUs for prediction. Motion vectors are derived for each 8×8 PU and motion compensation can be performed accordingly on the 8×8 PU. Under triangle prediction mode, a CU may be split into two triangular shape prediction units.

Figure 6:
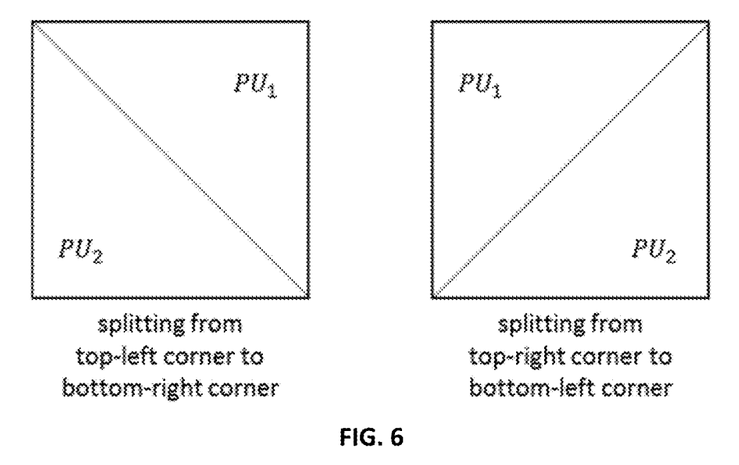
FIG. 6 is an illustration of splitting a CU into two triangular shape PUS.

FIG. 6 is an illustration of splitting a CU into two triangular shape PUs. As illustrated in FIG. 6, the CU is split into two triangular shape PUs, in either diagonal or inverse diagonal direction. Each triangular shape PU in the CU is inter-predicted using its own uni-directional motion vector and reference frame index which are derived from a uni-directional motion vector merge list. An adaptive weighting process is performed to the diagonal edge after predicting the triangular prediction units. Then, the transform and quantization process are applied to the whole CU. Although in FIG. 6 the CU is shown as a square block, triangle prediction mode is applied to non-square (i.e., rectangular) shape CUs as well.

Figure 7:
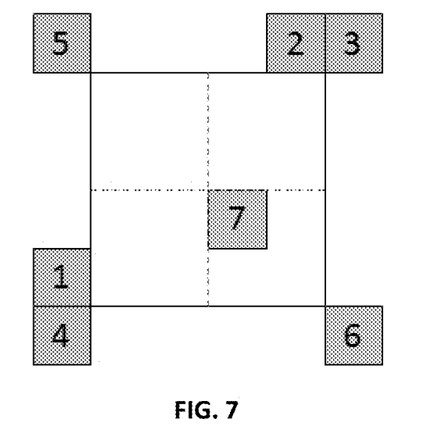
FIG. 7 is an illustration of the positions of spatial neighboring blocks and temporal co-located blocks used in constructing the uni-directional motion vector merge list for the triangular shape PUs.

In VVC, the uni-directional motion vector merge list for the triangular shape PUS consists of five uni-directional motion vector candidates. FIG. 7 is an illustration of the positions of spatial neighboring blocks and temporal co-located blocks used in constructing the uni-directional motion vector merge list for the triangular shape PUs. In FIG. 7, the use of seven neighboring blocks including five spatial neighboring blocks (1 to 5) and two temporal co-located blocks (6 to 7) is shown. The motion vectors of the seven neighboring blocks are collected into a first merge list. Then a second merge list, i.e. the uni-directional motion vector merge list for the triangular shape PUs, is formed based on the first merge list motion vectors according to a specific order. Based on the order, the uni-directional motion vectors from the first merge list are put in the uni-directional motion vector merge list for the triangular shape PUs first, followed by a reference picture list 0 motion vector of the bi-directional motion vectors from the first merge list, and then a reference picture list 1 motion vector of the bi-directional motion vectors, and then followed by an averaged motion vector of the reference picture list 0 and the reference picture list 1 motion vectors of the bi-directional motion vectors. Finally, the uni-directional motion vector merge list for the triangular shape PUs is padded with zero motion vectors until the uni-directional motion vector merge list for the triangular shape PUs reaches a pre-defined size (which is five in the current VVC).

Still in VVC, motion vector competitions (MVCs) are then performed on the uni-directional motion vector merge list for the triangular shape PUs to select a motion vector candidate for each of the triangular shape PUs, and a predictor is derived for each of the triangular shape PUs based on the motion vector candidate chosen for the triangular shape PU. It is worth noting that the predictor derived for the triangular shape PU covers a larger area than the actual triangular shape PU so that there is an overlapped area of the two predictors along the shared diagonal edge of the two triangular shape PUs. An adaptive weighting process is then applied to the diagonal edge area between the two predictors to derive a final predictor for the CU.

Figure 8:
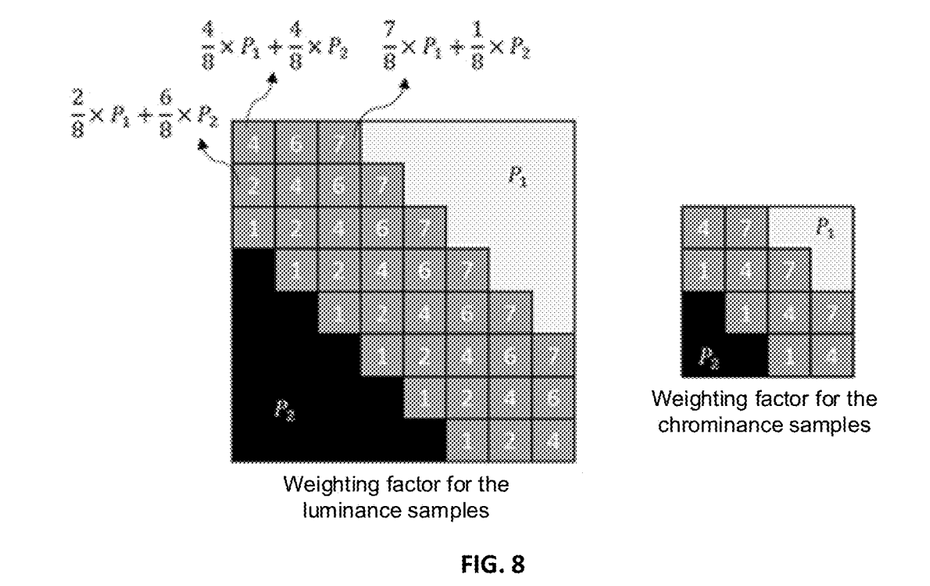
FIG. 8 shows an example of the adaptive weighting process which may be performed on the predictors of two neighboring triangular shape PUs.

FIG. 8 shows an example of the adaptive weighting process which may be performed on the predictors of two neighboring triangular shape PUs. In the left half of FIG. 8, the diagonal edge area between the two triangular shape PUs P1 and P2, both for the luminance samples, is marked with gray squares, each square corresponding to one pixel in the diagonal area. Each gray square in the left half of FIG. 8 is then marked with an adaptive weight used in this example of the adaptive weighting process. By way of example, the top-left gray square is marked with the number "4", which indicates that the predictor used for this pixel shall be a weighted linear combination between the predictor for P1 and the predictor for P2, with the weight given to the predictor for P1 equaling 4/8 and the weight given to the predictor for P2 equaling $$\frac{8-4}{8} = \frac{4}{8},$$

and this is also indicated by the label pointing to this same gray square with the text $$\frac{4}{8} \times P_1 + \frac{4}{8} \times P_2.$$

By way or another example, the gray square on the first row and on the third column from left is marked with the number "7", which indicates that the predictor used for this pixel shall be a weighted linear combination between the predictor for P1 and the predictor for P2, with the weight given to the predictor for P1 equaling 7/8 and the weight given to the predictor for P2 equaling $$\frac{8-7}{8} = \frac{1}{8},$$

and this is also indicated by the label pointing to this same gray square with the text $$\frac{7}{8} \times P_1 + \frac{1}{8} \times P_2.$$

in the night nan or FIG. 8, a similar scheme is employed to illustrate the adaptive weighting process between two triangular shape PUs P1 and P2, both for the chrominance samples.

Figure 9:
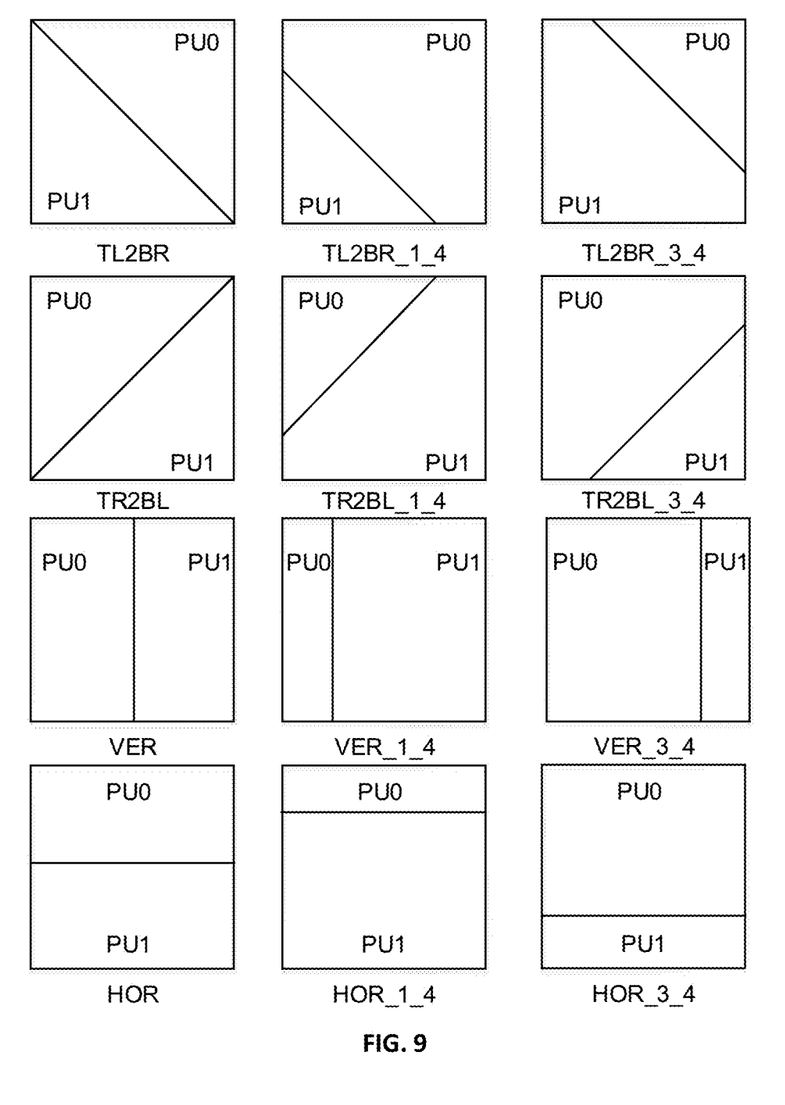
FIG. 9 is an illustration of PU partitions in proposal JVET-L0208.

In the current VVC, there are also some experimental extensions of the triangle prediction mode. For example, in proposal JVET-LO208, the idea of the triangular shape PU is extended to other partitions of the prediction units. FIG. 9 is an illustration of types of PU partitions in proposal JVET-LO208. In addition to the two diagonal triangular shape PU partitions, the proposal suggests the same idea is applied to other PU partitions. In each type of PU partition in proposal JVET-LO208, a CU is partitioned into two PUs, which may be rectangular or triangular shape, and then two uni-directional predictors are derived for each PU, and an adaptive weighting process is applied on the bordering area between the two PUs.

In the current VVC, there is also a regular merge mode wherein a whole CU is predicted without splitting the CU into more than one PU. In the regular merge mode, the motion vector merge list for the CU is constructed using a different procedure than that for the triangle prediction mode. This procedure includes first selecting spatial motion vector candidates based on motion vectors from neighboring blocks and then deriving temporal motion vector candidates based on a co-located PU belonging to the picture which has the smallest page order count (POC) difference with the current picture within the given reference picture list.

Figure 10:
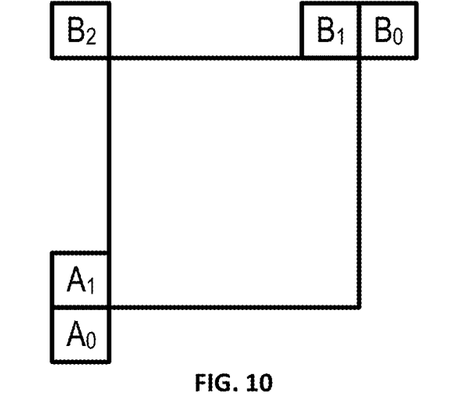
FIG. 10 is an illustration of the positions of spatial merge candidates used in the regular merge mode of VVC.

FIG. 10 is an illustration of the positions of spatial motion vector candidates used in the regular merge mode of VVC. A maximum of four spatial motion vector candidates are selected among the spatial motion vector candidates that are located in positions A1, B1, B0, A0 and B2 as shown in FIG. 10. The order of derivation is $A_1 \rightarrow B_1 \rightarrow B_0 \rightarrow A_0 \rightarrow (B_2)$. Position B2 is considered only when any PU of position A1, B1, B0, A0 is not available or is intra coded.

Figure 11:
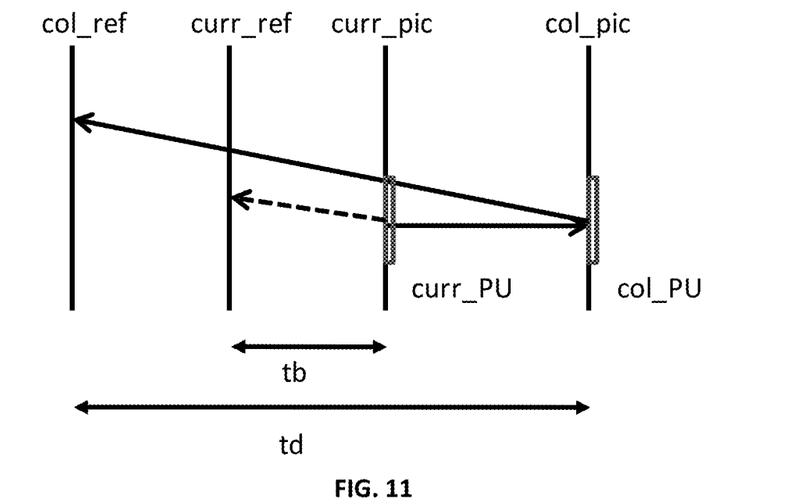
FIG. 11 is an illustration of motion vector scaling used in deriving a temporal merge candidate based on the co-located PU in the regular merge mode of VVC.

FIG. 11 is an illustration of motion vector scaling used in deriving a temporal motion vector candidate based on the co-located PU in the regular merge mode of VVC. A scaled motion vector is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of the temporal merge candidate is set equal to zero. A practical realization of the scaling process is described in the HEVC draft specification.

Figure 12:
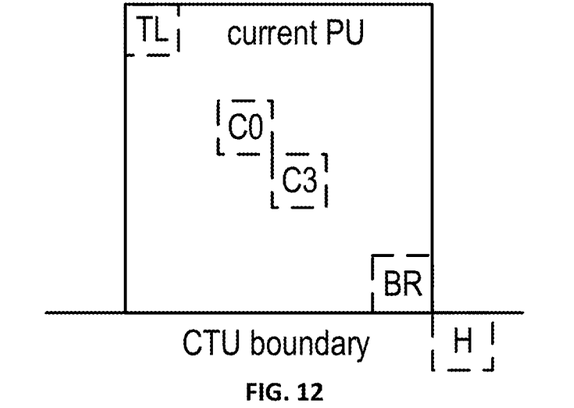
FIG. 12 is an illustration of the positions of co-located PUs in deriving temporal merge candidates used in the regular merge mode of VVC.

FIG. 12 is an illustration of the positions of co-located PUs in deriving temporal motion vector candidates used in the regular merge mode of VVC. The position of a co-located PU is selected between two candidate positions, C3 and H in FIG. 12. If the PU at position H is not available, is intra coded, or is outside of the current CTU, position C3 is used. Otherwise, position H is used for the derivation of the temporal motion vector candidate.

The construction of a motion vector merge for a whole CU in the regular merge mode of VVC and the construction of a uni-directional motion vector merge list for the triangular shape PUs in the triangle prediction mode of VVC share some similarities in terms of the overall procedures in forming a predictor. For example, under both prediction modes, a merge list needs to be constructed based on at least the current CU's neighboring spatial motion vectors and the current CU's collocated motion vectors.

At the same time, the construction of a motion vector merge list for a whole CU in the regular merge mode of VVC and the construction of a uni-directional motion vector merge list for the triangular shape PUs in the triangle prediction mode of VVC also have many different aspects. For example, although a merge list needs to be constructed under both the triangle prediction mode and the regular merge prediction mode, the detailed procedures of constructing such a list are different. Such differences incur additional cost to codec implementation as additional logics are needed.

According to the present disclosure, the construction of a uni-directional motion vector merge list for the triangular shape PUs in the triangle prediction mode of VVC does not have to be independent of the construction of a motion vector merge list for a whole CU. Instead, in the triangle prediction mode of VVC, for each CU comprising a plurality of triangular shape PUs, a motion vector merge list for a whole CU will be constructed first, and then the uni-directional motion vector merge list for the plurality of triangular shape PUs will be constructed based on the motion vector merge list constructed for the CU.

According to an embodiment of the present disclosure, in the triangle prediction mode of VVC, for each CU comprising a plurality of triangular shape PUs, the motion vector merge list constructed for the CU is the same as the one used for the regular merge mode. In this embodiment, the construction of a uni-directional motion vector merge list for the triangular shape PUs in the triangle prediction mode of VVC is not independent of the construction of a motion vector merge list for a whole CU in the regular merge mode of VVC.

According to another embodiment of the present disclosure, in the triangle prediction mode of VVC, for each CU comprising a plurality of triangular shape PUs, after the motion vector merge list for a whole CU has been constructed first, the uni-directional motion vector merge list for the plurality of triangular shape PUs will be initialized as an empty list, and then uni-directional motion vector candidates will be extracted and selected based on a pre-defined order from the motion vector merge list constructed for the CU, and will be added to the uni-directional motion vector merge list. And when adding a uni-directional motion vector candidate into the uni-directional motion vector merge list, the uni-directional motion vector candidate will be compared against either none, all or an identifiable plurality of motion vectors already present in the uni-directional motion vector merge list for the plurality of triangular shape PUs, and the uni-directional motion vector candidate will be appended to an end of the uni-directional motion vector merge list for the plurality of triangular shape PUs when the comparison has concluded that there is no duplication, until the uni-directional motion vector merge list for the plurality of triangular shape PUs reaches a pre-defined size, and finally the uni-directional motion vector merge list for the plurality of triangular shape PUs will be padded with zero motion vectors with reference to reference pictures, in another pre-defined order, until the uni-directional motion vector merge list for the plurality of triangular shape PUs reaches the pre-defined size.

In some examples, the extraction and selection of uni-directional motion vector candidates based on a pre-defined order from the motion vector merge list constructed for the CU will involve identifying each motion vector of a plurality of motion vectors in the motion vector merge list as a uni-directional motion vector or a bi-directional motion vector.

In some examples, the extraction and selection of uni-directional motion vector candidates based on a pre-defined order from the motion vector merge list constructed for the CU will further involve identifying each motion vector in the motion vector merge list as a "prediction list 0" uni-directional motion vector or a "prediction list 1" uni-directional motion vector or a bi-directional motion vector including a "prediction list 0" and a "prediction list 1" motion vector components, based on whether the motion vector was constructed with reference to a reference picture in reference picture list 0 or a reference picture in reference picture list 1 or two references pictures respectively from reference picture list 0 and reference picture list 1.

In some examples, the extraction and selection of uni-directional motion vector candidates based on a pre-defined order from the motion vector merge list constructed for the CU will further involve adding in-place in the motion vector merge list, for each bi-directional motion vector in the motion vector merge list, a "prediction list 0" motion vector component and a "prediction list 1" motion vector component of the bi-directional motion vector, with the "prediction list 0" motion vector component and the "prediction list 1" motion vector component containing substantially a same type and a same amount of information as any uni-directional motion vector in the motion vector merge list, and with the "prediction list 0" motion vector component in the precedent position and the "prediction list 1" motion vector component in the subsequent position.

In some examples, the extraction and selection of uni-directional motion vector candidates based on a pre-defined order from the motion vector merge list constructed for the CU will further involve selecting a plurality of "prediction list 0" uni-directional motion vectors, "prediction list 1" uni-directional motion vectors, "prediction list 0" motion vector components, and "prediction list 1" motion vector components based on a pre-defined order from the motion vector merge list.

In some examples, the selection of a plurality of "prediction list 0" uni-directional motion vectors, "prediction list 1" uni-directional motion vectors, "prediction list 0" motion vector components, and "prediction list 1" motion vector components based on a pre-defined order from the motion vector merge list constructed for the CU will include first selecting all of the "prediction list 0" uni-directional motion vectors and all of the "prediction list 0" motion vector components from the motion vector merge list constructed for the CU, while preserving orders thereof, and then selecting all of the "prediction list 1" uni-directional motion vectors and all of the "prediction list 1" motion vector components from the motion vector merge list constructed for the CU, while preserving orders thereof. In these examples, the resulting uni-directional motion vector merge list will contain uni-directional motion vectors connected with reference picture list 0 first, and uni-directional motion vectors connected with reference picture list 1 afterwards.

In some examples, the selection of a plurality of "prediction list 0" uni-directional motion vectors, "prediction list 1" uni-directional motion vectors, "prediction list 0" motion vector components, and "prediction list 1" motion vector components based on a pre-defined order from the motion vector merge list constructed for the CU will include selecting all of the items from each motion vector candidate in the motion vector merge list constructed for the CU, while preserving orders thereof. Specifically, for a uni-directional motion vector candidate in the motion vector merge list constructed for the CU, the uni-directional motion vector candidate is selected directly; for a bi-directional motion vector candidate in the motion vector merge list constructed for the CU, the "prediction list 0" motion vector component is selected, followed by the "prediction list 1" motion vector component of the bi-directional motion vector. In these examples, the resulting uni-directional motion vector merge list will contain uni-directional motion vectors connected with reference picture list 0 and reference picture list 1 in an interleaved manner.

In some examples, the selection of a plurality of "prediction list 0" uni-directional motion vectors, "prediction list 1" uni-directional motion vectors, "prediction list 0" motion vector components, and "prediction list 1" motion vector components based on a pre-defined order from the motion vector merge list constructed for the CU will include first selecting all of the "prediction list 0" uni-directional motion vectors and all of the "prediction list 1" uni-directional motion vectors from the motion vector merge list constructed for the CU, while preserving orders thereof, and then selecting all of the "prediction list 0" motion vector components and all of the "prediction list 1" motion vector components from the motion vector merge list constructed for the CU, while preserving orders thereof. In these examples, the resulting uni-directional motion vector merge list will contain the original uni-directional motion vectors in the motion vector merge list constructed for the CU first, followed by the uni-directional components of the original bi-directional motion vectors in the motion vector merge list constructed for the CU.

In some examples, the uni-directional motion vector merge list will be initialized as an empty list and then appended with the uni-directional motion vector candidates one by one selected according to methods described above, until the uni-directional motion vector merge list reaches a pre-defined size.

In some examples, the uni-directional motion vector merge list will be initialized as an empty list and then appended with the uni-directional motion vector candidates one by one selected according to methods described above when the to-be-appended uni-directional motion vector candidate passes a pruning test, until the uni-directional motion vector merge list reaches a pre-defined size.

In some examples, the pruning test includes comparing the to-be-appended uni-directional motion vector candidate to all of the uni-directional motion vectors already present in the uni-directional motion vector merge list, and deciding the to-be-appended uni-directional motion vector candidate to have passed the pruning test if the comparison concludes that there is no duplication.

In some examples, the pruning test includes comparing the to-be-appended uni-directional motion vector candidate to a pre-defined portion of the uni-directional motion vectors already present in the uni-directional motion vector merge list, and deciding the to-be-appended uni-directional motion vector candidate to have passed the pruning test if the comparison concludes that there is no duplication.

In some examples, the pre-defined portion of the uni-directional motion vectors already present in the uni-directional motion vector merge list for the pruning test is a pre-defined count of uni-directional motion vectors already present in the uni-directional motion vector merge list, starting from the current beginning of the uni-directional motion vector merge list.

In some examples, the pre-defined portion of the uni-directional motion vectors already present in the uni-directional motion vector merge list for the pruning test is a pre-defined count of uni-directional motion vectors already present in the uni-directional motion vector merge list, starting backwards from the current end of the uni-directional motion vector merge list.

In some examples, the uni-directional motion vector merge list constructed based on the method described above is less in size than a pre-defined size, and a padding process is employed to pad the uni-directional motion vector merge list to the pre-defined size.

In some examples, the padding process includes adding a zero motion vector for each reference picture present in the reference picture list 0, ordered by increasing absolute POC difference between the reference picture and the current picture, until the uni-directional motion vector merge list reaches a pre-defined size, and then adding a zero motion vector for each reference picture present in the reference picture list 1, ordered by increasing absolute POC difference between the reference picture and the current picture, until the uni-directional motion vector merge list reaches a pre-defined size.

In some examples, the padding process includes adding a zero motion vector for each reference picture present in the reference picture list 0 and the reference picture list 1, ordered by increasing absolute POC difference between the reference picture and the current picture, until the uni-directional motion vector merge list reaches a pre-defined size.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

The invention claimed is:

1. A method of video encoding comprising:
   partitioning a video picture into a plurality of coding units (CUs), wherein at least one of the plurality of CUs is further partitioned into a plurality of triangular shape prediction units (PUs);
   constructing a motion vector merge list for a CU comprising a plurality of triangular shape PUS;
   obtaining a plurality of uni-directional motion vector candidates each comprising one motion vector of a corresponding candidate in the motion vector merge list; and
   deriving a predictor for each of the plurality of triangular shape PUs based on a uni-directional motion vector candidate of the plurality of uni-directional motion vector candidates,
   wherein obtaining the plurality of uni-directional motion vector candidates comprises:
   obtaining respective uni-directional motion vector candidates for the PUs from a plurality of motion vector candidates in the motion vector merge list constructed for the CU, while orders thereof are preserved.

2. The method of claim 1, wherein the motion vector merge list constructed for the CU is the same as the one used for a regular merge mode.

3. The method of claim 1, further comprising: constructing a uni-directional motion vector merge list for the plurality of triangular shape PUs based on the motion vector merge list constructed for the CU by:
   initializing the uni-directional motion vector merge list for the plurality of triangular shape PUs as an empty list;
   adding the uni-directional motion vector candidates to the uni-directional motion vector merge list for the plurality of triangular shape PUs, and when adding a uni-directional motion vector candidate to the uni-directional motion vector merge list for the plurality of triangular shape PUs, comparing the uni-directional motion vector candidate against either none, all or an identifiable plurality of motion vectors already present in the uni-directional vector merge list for the plurality of triangular shape PUs and appending the uni-directional motion vector candidate to an end of the uni-directional motion vector merge list for the plurality of triangular shape PUS when the comparison has concluded that there is no duplication, until the uni-directional vector merge list for the plurality of triangular shape PUs reaches a pre-defined size; and
   padding the uni-directional motion vector merge list for the plurality of triangular shape PUs with zero motion vectors with reference to reference pictures, in another pre-defined order, until the uni-directional motion vector merge list for the plurality of triangular shape PUs reaches the pre-defined size.

4. The method of claim 3, wherein obtaining respective uni-directional motion vector candidates from various motion vector candidates in the motion vector merge list constructed for the CU, while orders thereof are preserved comprises:
   identifying each motion vector of a plurality of motion vectors in the motion vector merge list as a "prediction list 0" uni-directional motion vector or a "prediction list 1" uni-directional motion vector or a bi-directional motion vector including a "prediction list 0" and a "prediction list 1" motion vector components, based on whether the motion vector was constructed with reference to a reference picture in reference picture list 0 or a reference picture in reference picture list 1 or two references pictures respectively from reference picture list 0 and reference picture list 1; and
   selecting a plurality of "prediction list 0" uni-directional motion vectors, "prediction list 1" uni-directional motion vectors, "prediction list 0" motion vector components, and "prediction list 1" motion vector components from the motion vector merge list while preserving orders thereof.

5. The method of claim 4, wherein selecting a plurality of "prediction list 0" uni-directional motion vectors, "prediction list 1" uni-directional motion vectors, "prediction list 0" motion vector components, and "prediction list 1" motion vector components from the motion vector merge list constructed for the CU while preserving orders thereof comprises:
   for a uni-directional motion vector candidate in the motion vector merge list constructed for the CU, directly selecting the uni-directional motion vector candidate; and
   for a bi-directional motion vector candidate in the motion vector merge list constructed for the CU, selecting the "prediction list 0" motion vector component, and then selecting the "prediction list 1" motion vector component of the bi-directional motion vector.

6. A computing device comprising:
   one or more processors;
   a non-transitory storage coupled to the one or more processors; and
   a plurality of programs stored in the non-transitory storage that, when executed by the one or more processors, cause the computing device to perform acts comprising:
   partitioning a video picture into a plurality of coding units (CUs), wherein at least one of the plurality of CUs is further partitioned into a plurality of triangular shape prediction units (PUs);
   constructing a motion vector merge list for a CU comprising a plurality of triangular shape PUS;

obtaining a plurality of uni-directional motion vector candidates each comprising one motion vector of a corresponding candidate in the motion vector merge list; and deriving a predictor for each of the plurality of triangular shape PUs based on a uni-directional motion vector candidate of the plurality of uni-directional motion vector candidates, wherein obtaining the plurality of uni-directional motion vector candidates comprises:

obtaining respective uni-directional motion vector candidates for the PUs from a plurality of motion vector candidates in the motion vector merge list constructed for the CU, while orders thereof are preserved.

7. The computing device of claim 6, wherein the motion vector merge list constructed for the CU is the same as the one used for a regular merge mode.

8. The computing device of claim 6, further comprising: constructing a uni-directional motion vector merge list for the plurality of triangular shape PUs based on the motion vector merge list constructed for the CU by:

initializing the uni-directional motion vector merge list for the plurality of triangular shape PUs as an empty list;

adding the uni-directional motion vector candidates to the uni-directional motion vector merge list for the plurality of triangular shape PUs, and when adding a uni-directional motion vector candidate to the uni-directional motion vector merge list for the plurality of triangular shape PUs, comparing the uni-directional motion vector candidate against either none, all or an identifiable plurality of motion vectors already present in the uni-directional vector merge list for the plurality of triangular shape PUs and appending the uni-directional motion vector candidate to an end of the uni-directional motion vector merge list for the plurality of triangular shape PUs when the comparison has concluded that there is no duplication, until the uni-directional vector merge list for the plurality of triangular shape PUs reaches a pre-defined size; and padding the uni-directional motion vector merge list for the plurality of triangular shape PUs with zero motion vectors with reference to reference pictures, in another pre-defined order, until the uni-directional motion vector merge list for the plurality of triangular shape PUs reaches the pre-defined size.

9. The computing device of claim 8, wherein selecting respective uni-directional motion vector candidates from various motion vector candidates in the motion vector merge list constructed for the CU, while orders thereof are preserved comprises:

identifying each motion vector of a plurality of motion vectors in the motion vector merge list as a "prediction list 0" uni-directional motion vector or a "prediction list 1" uni-directional motion vector or a bi-directional motion vector including a "prediction list 0" and a "prediction list 1" motion vector components, based on whether the motion vector was constructed with reference to a reference picture in reference picture list 0 or a reference picture in reference picture list 1 or two references pictures respectively from reference picture list 0 and reference picture list 1; and selecting a plurality of "prediction list 0" uni-directional motion vectors, "prediction list 1" uni-directional motion vectors, "prediction list 0" motion vector components, and "prediction list 1" motion vector components from the motion vector merge list while preserving orders thereof.

10. The computing device of claim 9, wherein selecting a plurality of "prediction list 0" uni-directional motion vectors, "prediction list 1" uni-directional motion vectors, "prediction list 0" motion vector components, and "prediction list 1" motion vector components from the motion vector merge list constructed for the CU while preserving orders thereof comprises:

for a uni-directional motion vector candidate in the motion vector merge list constructed for the CU, directly selecting the uni-directional motion vector candidate; and for a bi-directional motion vector candidate in the motion vector merge list constructed for the CU, selecting the "prediction list 0" motion vector component, and then selecting the "prediction list 1" motion vector component of the bi-directional motion vector.

11. A non-transitory computer readable storage medium storing a bitstream generated by a method of video encoding comprising:

partitioning a video picture into a plurality of coding units (CUs), wherein at least one of the plurality of CUs is further partitioned into a plurality of triangular shape prediction units (PUs);

constructing a motion vector merge list for a CU comprising a plurality of triangular shape PUS;

obtaining a plurality of uni-directional motion vector candidates each comprising one motion vector of a corresponding candidate in the motion vector merge list; and deriving a predictor for each of the plurality of triangular shape PUs based on a uni-directional motion vector candidate of the plurality of uni-directional motion vector candidates, wherein obtaining the plurality of uni-directional motion vector candidates comprises:

obtaining respective uni-directional motion vector candidates for the PUs from a plurality of motion vector candidates in the motion vector merge list constructed for the CU, while orders thereof are preserved.

12. The non-transitory computer readable storage medium of claim 11, wherein the motion vector merge list constructed for the CU is the same as the one used for a regular merge mode.

13. The non-transitory computer readable storage medium of claim 11, further comprising: constructing a uni-directional motion vector merge list for the plurality of triangular shape PUs based on the motion vector merge list constructed for the CU by:

initializing the uni-directional motion vector merge list for the plurality of triangular shape PUs as an empty list;

adding the uni-directional motion vector candidates to the uni-directional motion vector merge list for the plurality of triangular shape PUs, and when adding a uni-directional motion vector candidate to the uni-directional motion vector merge list for the plurality of triangular shape PUs, comparing the uni-directional motion vector candidate against either none, all or an identifiable plurality of motion vectors already present in the uni-directional vector merge list for the plurality of triangular shape PUs and appending the uni-directional motion vector candidate to an end of the uni-directional motion vector merge list for the plurality of triangular shape PUS when the comparison has concluded that there is no duplication, until the uni-directional vector merge list for the plurality of triangular shape PUs reaches a pre-defined size; and padding the uni-directional motion vector merge list for the plurality of triangular shape PUs with zero motion vectors with reference to reference pictures, in another pre-defined order, until the uni-directional motion vector merge list for the plurality of triangular shape PUs reaches the pre-defined size.

14. The non-transitory computer readable storage medium of claim 13, wherein selecting respective uni-directional motion vector candidates from various motion vector candidates in the motion vector merge list constructed for the CU, while orders thereof are preserved comprises:

identifying each motion vector of a plurality of motion vectors in the motion vector merge list as a "prediction list 0" uni-directional motion vector or a "prediction list 1" uni-directional motion vector or a bi-directional motion vector including a "prediction list 0" and a "prediction list 1" motion vector components, based on whether the motion vector was constructed with reference to a reference picture in reference picture list 0 or a reference picture in reference picture list 1 or two references pictures respectively from reference picture list 0 and reference picture list 1; and selecting a plurality of "prediction list 0" uni-directional motion vectors, "prediction list 1" uni-directional motion vectors, "prediction list 0" motion vector components, and "prediction list 1" motion vector components from the motion vector merge list while preserving orders thereof.

15. The non-transitory computer readable storage medium of claim 14, wherein selecting a plurality of "prediction list 0" uni-directional motion vectors, "prediction list 1" uni-directional motion vectors, "prediction list 0" motion vector components, and "prediction list 1" motion vector components from the motion vector merge list constructed for the CU while preserving orders thereof comprises:

for a uni-directional motion vector candidate in the motion vector merge list constructed for the CU, directly selecting the uni-directional motion vector candidate; and for a bi-directional motion vector candidate in the motion vector merge list constructed for the CU, selecting the "prediction list 0" motion vector component, and then selecting the "prediction list 1" motion vector component of the bi-directional motion vector.

* * * * *